G. McVOY.
QUICK ATTACHABLE PIPE UNION.
APPLICATION FILED DEC. 17, 1917.
1,308,853.
Patented July 8, 1919.
2 SHEETS—SHEET 1.
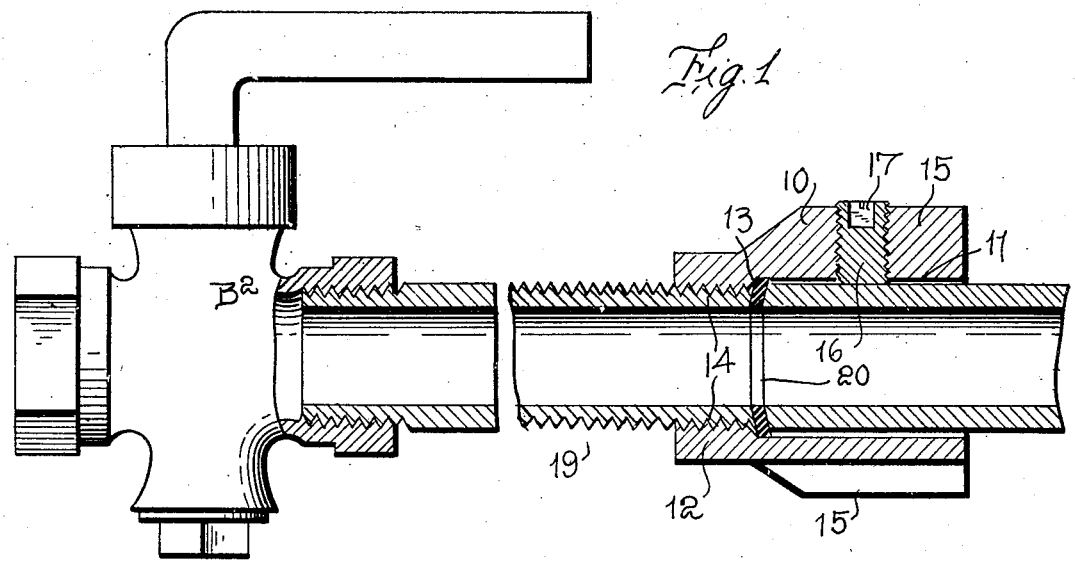
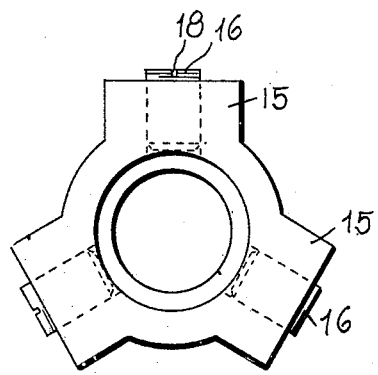
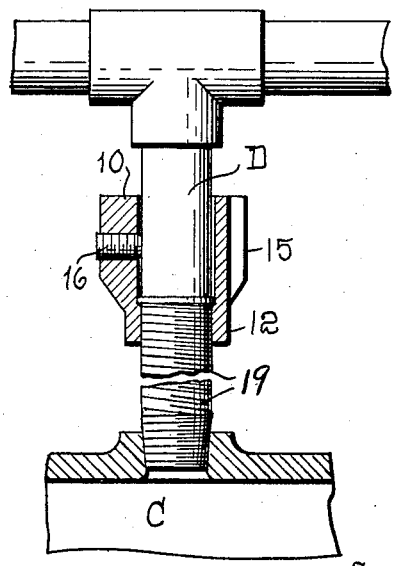
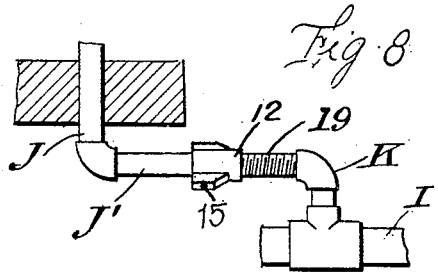
Inventor
GEORGE McVOY
By Watson E. Coleman
Attorney

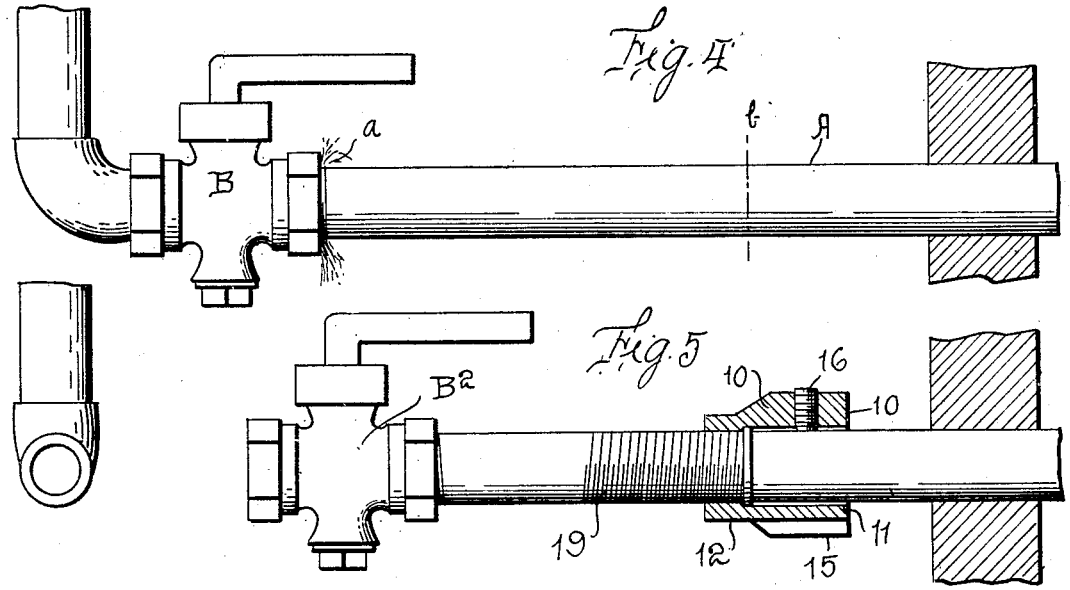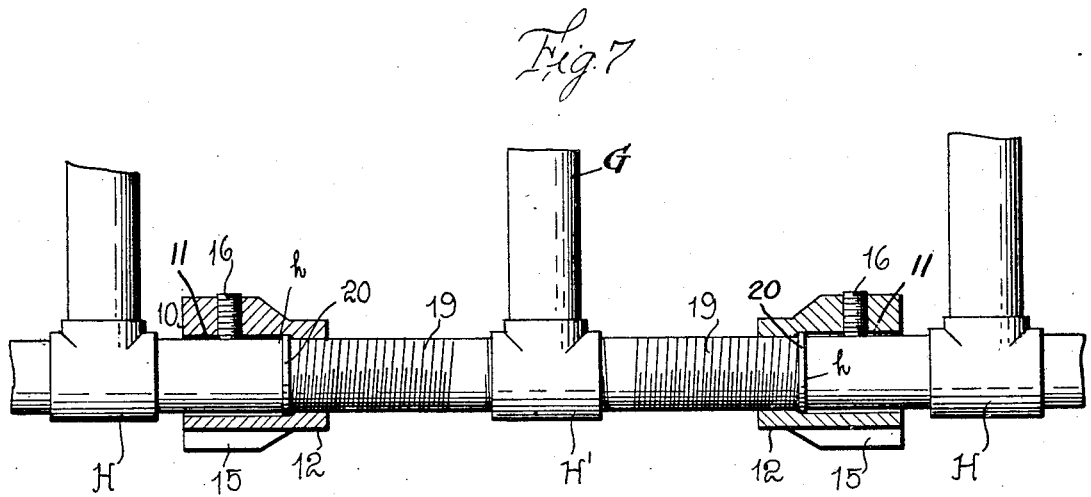

UNITED STATES PATENT OFFICE.

GEORGE McVOY, OF SCOTCH PLAINS, NEW JERSEY.

QUICK-ATTACHABLE PIPE-UNION.

1,308,853.   Specification of Letters Patent.   Patented July 8, 1919.

Application filed December 17, 1917. Serial No. 207,568.

*To all whom it may concern:*

Be it known that I, GEORGE McVOY, a citizen of the United States, residing at Scotch Plains, in the county of Union and State of New Jersey, have invented certain new and useful Improvements in Quick-Attachable Pipe-Unions, of which the following is a specification, reference being had to the accompanying drawings.

This invention relates to the joining of water pipes and steam pipes, and particularly to a union to be used in joining the abutting ends of a pipe line. There are to-day on the market but a few forms of union for connecting pipes and these forms may be divided roughly into two classes, that is, a union having screw-threaded ends for screw-threaded engagement with the confronting ends of two pieces or lengths of pipe, and the flanged union where the ends of the pipe are provided with flanges which are abutted against each other and drawn together by means of screws.

Where a break is to be repaired or where, in any case, a new section of pipe is to be disposed in a pipe line, it is necessary, where either of these unions is used, that the adjacent ends of the length of pipe be screw-threaded. Not only is this screw-threading a more or less tedious and expensive job, but wherever pipes are of a size over 2″ in diameter, the dies necessary to cut the pipe are relatively heavy and the operation of cutting the pipe requires the services of at least two workmen. Furthermore, where a piece is cut out of a length of pipe for any reason and a new length of pipe added or inserted, it is necessary to cut screw-threads and use one, two or three screw-threaded unions joining the insert to the main pipe.

The object of my invention is to obviate these difficulties by providing a union of such form that it may be readily inserted at any point in a pipe line and readily joined with the ends of the pipe lengths, without the necessity of cutting the threads, and so formed, furthermore, that the union may be disposed in position and the pipe lengths joined even against the pressure of water which would prevent, ordinarily, the proper screwing together of the unions and inserted pipe in the pipe line.

A further object of the invention is to so construct the union that a certain play may be had between the pipe lengths so as to permit the screw-threaded end of a pipe to be readily inserted in and engaged with the union proper sufficient to catch the threads and permit the union to draw the pipe ends together, which in the ordinary union is a very difficult matter, and in this connection to provide a union which does not require the extreme accuracy of threading and fitting which is necessary under some circumstances, particularly in connecting pipes to steam boilers or steam lines.

Further objects are to provide a union or steam fitting of this character which will take the place of flanged unions or right and left couplings and nipples, and which will do away entirely with the necessity of breaking cast iron fittings in old lines of pipe or cutting threads on pipe mains in order to insert a T or other pipe section.

A further object is to provide a union of this kind which may be used where the water pressure is on for repairing broken or bursted pipes or for inserting new valves or new sections of pipe.

Other objects and advantages of my invention will appear in the course of the following description.

My invention is illustrated in the accompanying drawings, wherein:—

Figure 1 is a longitudinal sectional view of my pipe fitting;

Fig. 2 is an end elevation of the union proper;

Fig. 3 is an end view of one of the set screws;

Fig. 4 is an elevation showing an ordinary water pipe connection with a leak;

Fig. 5 is a like view to Fig. 4 but showing my attachment in applied position, the union being in section;

Fig. 6 is an elevation showing another use of my improved fitting, the union being in section;

Fig. 7 is an elevation partly in section showing another application of the fitting; and Fig. 8 is an elevation showing still another application of the fitting.

Fig. 1 shows the body of the union, or what might be termed the union proper. This body 10 may have a number of different forms exteriorly, but it is formed with an interior bore extending through the union, one portion 11 of this bore being larger than the other portion 12, so as to form a seat 13. The portion 12 is interiorly screw-threaded as at 14. The portion 11, however, is not screw-threaded. Assuming that the portion 14 is adapted to receive a ⅞" pipe, then the portion 11 of the bore will have an interior diameter of 1⅛"; in other words, will have a diameter 2/8" larger than the portion 12. The wall of the portion 11 may be thickened at a plurality of points, as at 15 and these thickened portions of the wall are screw-threaded for the reception of radially extending set screws 16. I do not wish to be limited to any particular form for these set screws, as they may be made in a variety of forms, but preferably the head of each set screw, as illustrated in Fig. 1, is formed with a socket 17 for the reception of a key, whereby the set screw can be turned and is also transversely notched or grooved as at 18, so that a screw driver may be engaged therewith. These set screws may also be formed with many-sided heads for engagement by a wrench in the ordinary or common manner. There are preferably at least three of these thickened portions 15 and three set screws so that a pipe inserted in the pipe socket 11 may be properly centered by the set screws.

Engaging with the screw-threads 14 of the socket portion 12 is a short length of pipe or nipple 19. This length of pipe preferably has about five screw-threads to engage the screw-threads of the portion 14 but at its other end is provided with a relatively larger number of screw-threads as for instance seven. The threads on that end of the pipe section or nipple 19 which engages in the socket portion 12 are what are known as loose threads, so that they enter the body 10 very easily.

Disposed within the body 10 and bearing against the seat 13 is a gasket 20. This washer or gasket has a width greater than the width of the shoulder 13, as illustrated in Fig. 1, so that the washer projects inward beyond the shoulder a distance equal to the thickness of the pipe section 19 or nipple. It will be obvious now that when the pipe section is inserted in the socket 11 and forced against the gasket and held from movement by the set screws, and then the pipe section 19 is screwed into the socket portion 14 and forced against the washer or gasket, that a tight joint will be secured between the pipes with no leakage around this joint and through the coupling member 10.

It will be obvious, of course, that these members 10, with their nipples 19 will be formed of various sizes for different diameters of pipe and for different work and I do not wish to limit myself to the particular form of the body 10 as for instance provided with the thickened portions 15. I provide the thickened portions 15 primarily for the purpose of giving a firm engagement of the set screws with the coupling body 10 and further that thereby a wrench might, under some circumstances, be applied to the coupling member itself to rotate it. It is to be noted that the socket 11 has a diameter sufficiently greater than the pipes to be joined that there will be a certain amount of play between the coupling body 10 and the pipe section inserted in the socket 11. For instance, in the drawing, the nipple 19 has an outside diameter of 1" and an inside diameter of ¾". The socket 11 is intended to accommodate a section of a pipe having an exterior diameter of 1" and an interior diameter of ¾". Therefore, it will be seen that the body 10 may rock to a certain extent or be angularly disposed with relation to the pipe section inserted in the pipe section 11, while engagement is being made between the nipple 19 and the socket 14, so as to allow of an easy connection of the body 10 with the nipple 19. After the connection has been initially made the set screws 16 may be tightened so as to firmly hold the coupling upon the body 10.

While this coupling is relatively simple in construction, I have found in practical work as a plumber and steam fitter, that it is of very great value in a larger number of different emergencies and that it fills a place which no other coupling or union known to me fills.

In order to show the advantages and possibilities of this union, I have thought it best to illustrate its application by reference to Figs. 4 to 8. Referring to Fig. 4, A designates a water supply pipe coming in from the street main and connected to the house service pipes, there being a valve B controlling passage to the house service pipes. Now a break occurs at the point $a$ and water is entering the basement of the house through this break. Ordinarily it is necessary to turn off the curb valve of the pipe A or dig up the street to find the valve which connects the pipe A to the street main. This ordinarily takes some time. Meanwhile the water is pouring into the house. There is also great difficulty in finding the curb valve and even when found or where it is in plain view, it is in most cases impossible to turn the curb valve because of rust or binding. The ordinary procedure would be to cut off the flow of water at the curb, cut the pipe A, remove the bursted section, thread the ends of the pipe sections A and insert an intermediate section by means of couplings. The pipe A, however, may be so located as to make threading very difficult and, furthermore, it is practically impossible to screw-thread a pipe section and put on either a valve or a union while water is flowing out through the pipe at high pressure.

In Fig. 5, I show how this is done by means of my union. The pipe is cut at the point $b$ in Fig. 4, and the valved end of the water supply pipe is turned to one side. The coupling body 10 has attached thereto the nipple 19 which in turn is connected to a valve B² which valve is opened and the coupling body 10 is inserted over the cut end of the pipe until the extremity of the pipe abuts against the gasket 20. The set screws are then turned home and when the pipe is securely in place the valve B² is closed, cutting off the water. After the water is cut off, the valve B may be removed and then connection may be readily made between the house water pipe and the valve B² by the usual fitting operation. Now the cutting of the pipe at the point $b$ may be very readily accomplished with an ordinary three-wheel cutter, and without the necessity of any screw-threading or the use of taps or dies. I have found in actual experience that it is possible by the use of this coupling to repair a break of this kind, without the necessity of shutting off the water at the curb or street and in a very short time and without particularly expert labor. The valve B² might, of course, be connected directly to the body 10 and the nipple 19 omitted. Inasmuch as there is no thread cutting, a great saving of labor is effected and the union is particularly of value in close work.

The union is also of equal value in steam fitting. Thus, for instance, if it be desired to install a new boiler C as in Fig. 6, this fitting may be used to connect the boiler to the steam pipes. In this case the pipe D is cut by the ordinary three-wheel cutter, a new boiler installed, the coupling body 10 is inserted with its socket 11 over the pipe B and the nipple 19 is connected either directly to the boiler or to intermediate pipes. In this case the nipple is made with right and left hand threads and after the pipe D is engaged firmly with the pipe coupling 10 by means of the set screws, the nipple 19 is turned until the end of the nipple 19 bears against the gasket in the manner described, whereupon a thoroughly steam tight joint is formed. It will be obvious that this connection may also be used where it is desired to join a new pipe to an old boiler, without removing the section of pipe which has screw threaded engagement with the boiler.

In Fig. 7, I illustrate the manner in which a pipe G leading, for instance, to a radiator may be inserted in a pipe line between two T's H. As before stated, where steam passes through the pipe the fittings become so tightly engaged with each other that it is practically impossible to remove the fittings and, therefore, it is a common practice, under these circumstances, to break the cast iron T's H, screw-thread the ends of the pipe on each side of the break, put in screw-threaded couplings connected to nipples, in turn connected to new T's H, these T's being connected by an intermediate section comprising a new T which will lead to the radiator to be connected to the pipe line and new nipples and unions. It will be obvious, therefore, that a great deal of screw-threading has to be done and that the cost of such a job is relatively large because of the new fittings which have to be used and the amount of work which has to be done. This great amount of work and the screw-threading is entirely eliminated by the use of my device, as it is not necessary to break the T's H, but the pipe line is cut at $h$ just inward of the T's H. One of my unions is then disposed with its socket portion 11 over each of the pipe sections projecting from the T's in the manner illustrated in Fig. 7, and a new T H' is inserted having projecting therefrom the nipples 19, these nipples being reversely screw-threaded at their opposite ends and these nipples 19 are accordingly engaged with the screw-threaded sockets 12 of the two unions. Then the nipples 19 are turned until the nipples have fully engaged against the gaskets 20 in the respective unions and the job is complete.

It is reiterated that in all cases no screw-threading on the broken or cut ends of the pipe *in situ* is required but that mere cutting of the pipe is necessary and that this may be readily accomplished by means of the ordinary three-wheel cutter which may be operated by one man. Screw-threading by means of taps and dies not only requires room, which is often times absolutely unavailable, but it requires two men on a pipe of a larger size than two inches. All the screw-threading that is done where my union is used is done in the shop and no screw-threading is necessary on the work.

In Fig. 8, I show how my union may be used to connect the steam pipe I to a riser J and extension pipe J'. In building houses and initially installing steam heating systems therein, it is usual to put the riser pipe J in the building while in the course of construction. After the building has been finished, the boiler and main I are installed and the pipe or pipes J are connected to the main I. This is not an easy matter because the pipe J extends down through the ceiling of a basement only about ten inches and if the opening for this pipe is accurately cut, the extension J' is held very rigidly and, as a consequence, the elbow K, with its connections, must be accurately placed to bring the pipe J' into alinement with the elbow. No such accuracy is necessary by the use of my union. In this case, the large socket of the union is engaged over the pipe J' and locked by the set screws. Then the nipple 19 is inserted against the gasket and into the elbow K and this nipple being right and left screw-threaded, rotation of the nipple will cause the nipple to draw the two pipes into alinement with each other. Attention is again called to the fact that there is a loose screw-threaded connection between the section 19 and the socket 12, which makes it relatively easy to insert the nipple 19 into the screw-threaded socket and catch the threads. A loose screw-threaded connection is distinguished from a tight screw-threaded connection by the fact that in the loose screw-threaded connection the screw-threads are cut of an even depth throughout their entire extent so that there is no binding as would be the case were the screw-threads cut with a gradually decreasing depth, as is necessary where a joint is to be water tight. In my construction the water or steam tight joint is secured by the abutting of the pipe sections against the lead gasket.

I have only illustrated certain jobs which may be accomplished by the use of my improved union, but it it to be understood that, as a matter of fact, the union may be used in a large variety of different circumstances and with great convenience and effectiveness. Of course the union may be made of malleable or cast iron and in various sizes and modified in detail in many ways, without departing from the spirit of the invention, as defined in the appended claims.

Having described my invention, what I claim is:—

1. As an article of manufacture, a pipe fitting comprising a union having a bore, one portion of the bore being relatively large and having a smooth interior and face of uniform interior diameter to receive a pipe section and the other portion being relatively small and screw-threaded, set screws passing into the relatively large portion of the bore, there being a shoulder formed at the juncture of the relatively large and small portions of the bore, a gasket disposed in the relatively large portion of the bore and bearing against the shoulder, and a manually operable valve operatively connected to that portion of the union having the relatively small bore.

2. A pipe fitting adapted to be inserted in a pipe line of uniform diameter comprising a union having a bore extending through it, one portion of the bore being slightly smaller than the other and screw-threaded for its entire length, the large portion of the bore being plain of uniform interior diameter, means for holding a pipe section within this portion of the bore, and an annular gasket disposed within the larger portion of the bore bearing against the shoulder at the junction of the relatively larger and smaller portions of the bore, said gasket having a width greater than the width of the shoulder, and having an interior diameter less than the interior diameter of the screw-threaded portion of the bore.

3. A pipe fitting comprising a union having a bore extending through it, one portion of the bore being smaller than the other and interiorly screw-threaded, the large portion of the bore being plain and adapted to receive a pipe section, there being a shoulder formed at the junction of the large and small portions of the bore, means for engaging a pipe section within the relatively large portion of the bore, a gasket disposed within the larger portion of the bore bearing against said shoulder, said gasket having a width greater than the width of the shoulder, and a nipple having loose screw-threaded engagement with the smaller portion of the bore, the gasket having an interior diameter approximately equal to that of the nipple.

4. The combination with two pipe sections having uniform exterior and interior diameters, said pipe sections being in line with each other, the adjacent end of one of said pipe sections being screw-threaded, of a union connecting said pipe sections, said union having a bore extending entirely through it, one portion of the bore having a smaller diameter than the other portion and being interiorly screw-threaded for engagement with the screw-threads of the said pipe section, the larger portion of the bore having a uniform interior diameter greater than the exterior diameter of the other pipe section, and loosely receiving it, a gasket disposed against the shoulder formed at the junction of the large and small portions of the bore and having an interior diameter approximately equal to the interior diameter of the two pipe sections and against which the pipe sections abut, and means for holding the union to that pipe section which extends into the relatively large portion of the bore and preventing a retraction of this pipe section.

In testimony whereof I hereunto affix my signature in the presence of two witnesses.

GEORGE McVOY.

Witnesses:
   Frederic B. Wright,
   M. B. Bobbitt.